United States Patent [19]

van Zon

[11] Patent Number: 5,361,071

[45] Date of Patent: Nov. 1, 1994

[54] MICROWAVE IDENTIFICATION SYSTEM

[75] Inventor: Bernardus C. van Zon, Hengelo, Netherlands

[73] Assignee: N.V. Nederlandsche Apparatenfabriek Nedap, De Groenlo, Netherlands

[21] Appl. No.: 910,034

[22] PCT Filed: Dec. 6, 1991

[86] PCT No.: PCT/NL91/00254

§ 371 Date: Aug. 6, 1992

§ 102(e) Date: Aug. 6, 1992

[87] PCT Pub. No.: WO92/10765

PCT Pub. Date: Jun. 25, 1992

[30] Foreign Application Priority Data

Dec. 6, 1990 [NL] Netherlands ............... 9002683

[51] Int. Cl.$^5$ ............................................. G01S 13/80
[52] U.S. Cl. ............................... 342/42; 342/44; 342/51
[58] Field of Search ........................ 342/42, 44, 51

[56] References Cited

U.S. PATENT DOCUMENTS

| 3,518,672 | 6/1970 | Zimmer | 342/370 |
|---|---|---|---|
| 3,898,663 | 8/1975 | Albert | 342/187 |
| 4,347,512 | 8/1982 | Sweeney | 342/6 |
| 4,364,043 | 12/1982 | Cole et al. | 340/825.54 |
| 4,370,653 | 1/1983 | Crowley | 342/44 |
| 4,647,931 | 3/1987 | Mawhinney | 342/44 |
| 4,899,158 | 2/1990 | Saeki et al. | 342/44 |
| 4,926,187 | 5/1990 | Sugarawa et al. | 342/361 |
| 4,963,887 | 10/1990 | Kawashima et al. | 342/44 |
| 4,983,976 | 1/1991 | Ogata et al. | 342/42 |
| 5,021,790 | 6/1991 | Ohta et al. | 342/44 |
| 5,053,774 | 10/1991 | Schuermann et al. | 342/44 |

FOREIGN PATENT DOCUMENTS 0079047 5/1983 European Pat. Off. .
0308964 3/1989 European Pat. Off. .

OTHER PUBLICATIONS

Microwave Journal, Flaherty: "Microcircuit Phased-Array Electronic Countermeasure System"; Sep. 1969.
Patent Abstracts of Japan; 12 Dec. 1977.

*Primary Examiner*—John B. Sotomayor
*Attorney, Agent, or Firm*—Jacobson, Price, Holman & Stern

[57] ABSTRACT

A microwave identification system comprising a transmitter/receiver provided with an antenna system, a plurality of responders provided with an antenna system, the communication between transmitter/receiver and responders taking place by means of electromagnetic waves in the microwave range, wherein the antenna system of the responders comprises an array with at least two antenna elements (12, 13) interconnected via a modulation device (14, 15, 16) and, for obtaining a retroreflective effect, the signal generated in an interrogation field by one of the two antenna elements is applied to the modulation device and, after being modulated with a code that is characteristic for the responder, is applied to the other antenna element to be radiated by the other antenna element.

14 Claims, 7 Drawing Sheets

MICROWAVE IDENTIFICATION SYSTEM

BACKGROUND OF THE INVENTION

This invention relates to microwave identification systems comprising a transmitter/receiver provided with an antenna system, a plurality of responders provided with an antenna system, the communication between transmitter/receiver and responders taking place by means of electromagnetic waves in the microwave range. The invention further relates to a responder for a microwave identification system.

Microwave identification systems are known in various designs. Reference is made to the following U.S. Patents: U.S. patent application No. 4,816,839, U.S. patent application No. 4,853,705, U.S. patent application No. 4,782,345, U.S. patent application No. 4,242,661.

A drawback of the known systems is that all of them utilize antenna systems that have a low to very low antenna amplification factor.

U.S. Pat. No. 4,853,705 in fact indicates that array-like antenna systems are not eligible for use precisely because of their-higher antenna amplification factors and inherent narrow beam widths.

In an identification system, an electronic interrogation unit can read out a code stored in the transponder and thereby identify the transponder.

The interrogation unit of a microwave identification system comprises a transmitter with a transmitting antenna which radiates an electromagnetic wave in the direction of the transponder and a receiver which receives the signal modulated by the responder and identifies the code of the responder.

The responder comprises an antenna system, a supply device for generating a DC voltage, a modulation device capable of modulating an electromagnetic wave and a chip with a control and storage function. The DC voltage is the source of energy for the chip.

The responder can varying dimensions from credit card size (the so-called microwave smartcard to dimensions of 0.5 by 0.25 m, depending on the use contemplated, for instance the identification of or electronic data interchange (EDI) with for instance persons, containers, cars, trains, and on the frequency band chosen. The frequency band can be in the range between about 1 GHz and about 40 GHz.

In operation, the responder receives signals from the interrogation unit, which signals are subsequently reflected or radiated again after having been provided with a code which unambiguously identifies the object or the person to which/whom this responder is attached or by which/whom it is carried otherwise. The responder can also be provided with new information.

The responder preferably draws the necessary energy entirely from the interrogation signal provided. Naturally, if the conditions are such that this energy supply is insufficient, use can be made of a battery to be arranged in the responder.

The antenna of the responder receives signals of a very low power density (typically smaller than 0.1 watt per square meter), modulates these signals, converts a part of the energy received into a DC voltage which provides the supply energy for a chip with a control and storage function, and reflects or radiates these signals again in the direction of the transmitter/receiver, also referred to as reader or interrogation unit, so as to transmit the information contained in the responder to the reader or interrogation unit.

Microwave responders are especially used for identifying very large numbers of objects or persons. The philosophy behind such responders must accordingly be "fit and forget", transponders without batteries being particularly qualified for use.

In order that sufficient DC voltage can be generated across a wide range of angles of incidence of the interrogation signal relative the responder and a largest possible reflection surface can be presented in the direction of the interrogation unit, it is desirable to choose the antenna amplification of the responder to be as large as possible.

A drawback of this choice is that a narrow beam width is inherent to a high antenna amplification. This means that there is less time available for providing the responder with energy and for reading out the responder and writing information in the transponder, and the available time may even become unacceptably reduced. This, in turn, means that this type of responder systems would be less eligible for use in situations where the speed of the objects to be identified or the angle of incidence of the microwave signal plays an important role.

SUMMARY OF THE INVENTION

It is an object of the invention to overcome the drawbacks outlined and more generally to provide an effective and reliable operating microwave identification system.

To that end, according to the invention, a microwave identification system of the type described hereinabove is characterized in that the antenna system of the responders comprises an array with at least two antenna elements which are interconnected via a modulation device, while for obtaining a retroreflective effect, the signal generated in an interrogation field by one of the two antenna elements is applied to the modulation device and, after having been modulated with a code that is characteristic for the responder, is applied to the other antenna element to be radiated by the other antenna element.

As a result, the antenna amplification maximum follows the (varying) direction from which the interrogation signal of the interrogation unit originates, so that the energy supply of the chip with the control and storage function is guaranteed across a larger beam width. The received unmodulated signal of the interrogation unit is modulated in phase or amplitude by the responder and retroreflected in the same direction from which the interrogation signal originated- This direction always coincides with the antenna amplification maximum of the responder. By this feature, the disadvantage of the narrower beam width is substantially overcome, so that a larger read/write distance is possible and the range of application for transponders without batteries becomes larger.

Hereinafter, the invention will be further described, by way of example, with reference to the accompanying drawings of some embodiments.

DETAILED DESCRIPTION OF THE DRAWINGS

Figure 1:
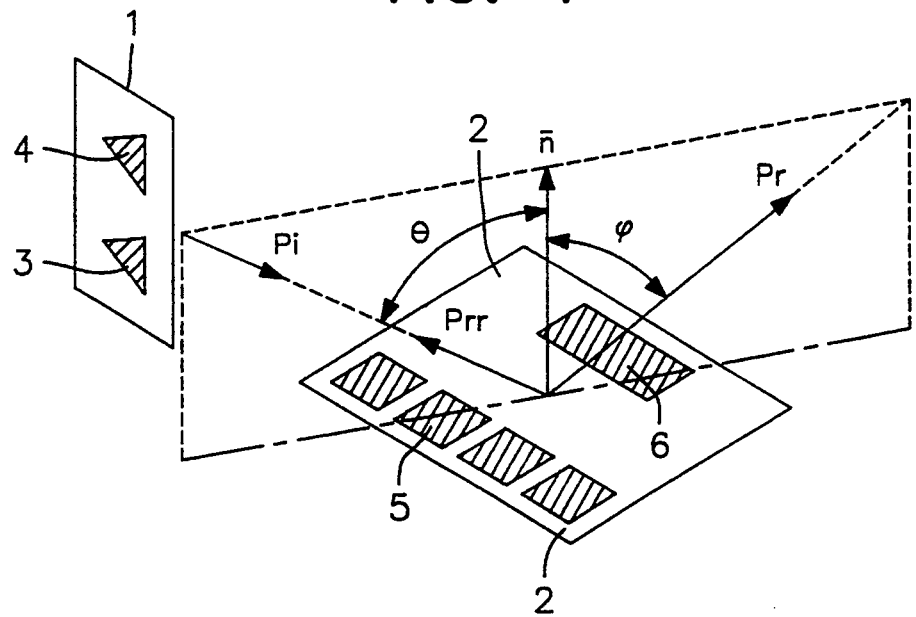
FIG. 1 schematically shows an example of a microwave identification system according to the invention.

FIG. 1 shows an interrogation unit 1 and a responder 2. The interrogation unit 1 comprises a transmitting antenna 3 and a receiving antenna 4. In operation, the transmitting antenna generates an electromagnetic wave Pi propagating in the direction of the responder 2. The wave will be incident on the responder at an angle $\theta$. The responder 2, which comprises an antenna system 5 and a semiconductor chip 6 comprising an electric circuit, reflects, in operation, a wave Pr at an angle $\Phi$ relative to the normal n to the responder surface if the antennas of the antenna system have been short-circuited. If the responder 2 comprises a retroreflective antenna system, all received energy from the wave Pi, after having been provided with the code of the responder by the electric circuit of the chip 6 which contains the control and storage function, will be radiated again exactly in the direction of the interrogation unit, as indicated with an arrow Prr in FIG. 1.

Figure 2A:
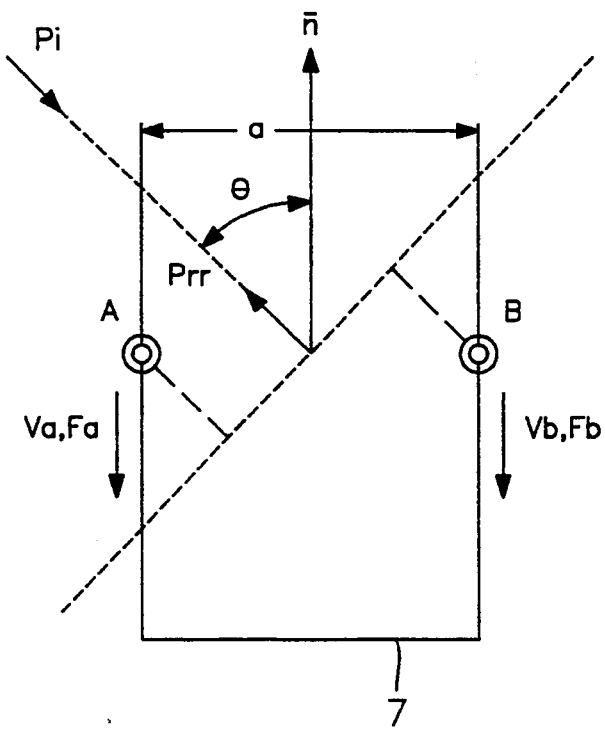
FIGS. 2a-2e illustrate the basic principle of the invention.

FIG. 2A illustrates the basic principle of the invention on the basis of two point radiators. The two point radiators or sources A and B are antenna elements of the antenna system of a microwave responder. If a wavefront Pi coming from the interrogation unit is incident at an angle $\theta$, with $\theta$ being the angle included by the normal n on the connecting line (not shown) between the two point sources A and B and the direction of the interrogation unit, in both antenna elements radiofrequent RF voltages Va and Vb of equal amplitudes but of different phases Fa and Fb, respectively, are generated.

A very important property of the phases of these two signals is that: $Fa = -Fb$.

The absolute magnitude of these phases is determined by the distance a between the two antenna elements, the wavelength $\lambda$ of the RF signal used and the angle $\theta$ according to the following formulas:

$$Fa = \tfrac{1}{2}.a.\sin\theta.2\pi\lambda \quad [1]$$

$$Fb = -\tfrac{1}{2}.a.\sin\theta.2\pi\lambda \quad [2]$$

If a connection is made between the point sources A and B by means of a transmission line 7, along which the two received signals Va, Fa and Vb, Fb can propagate, the signal received with phase Fa and amplitude Va by point radiator A will be radiated again by point radiator B and the signal received with phase Fb and amplitude Vb by point radiator B will be radiated again by point radiator A.

The result of this interchange is that a wavefront Prr arises in the direction of the interogation unit, the so-called retroreflected wave, as defined in FIG. 1.

Figure 2B:
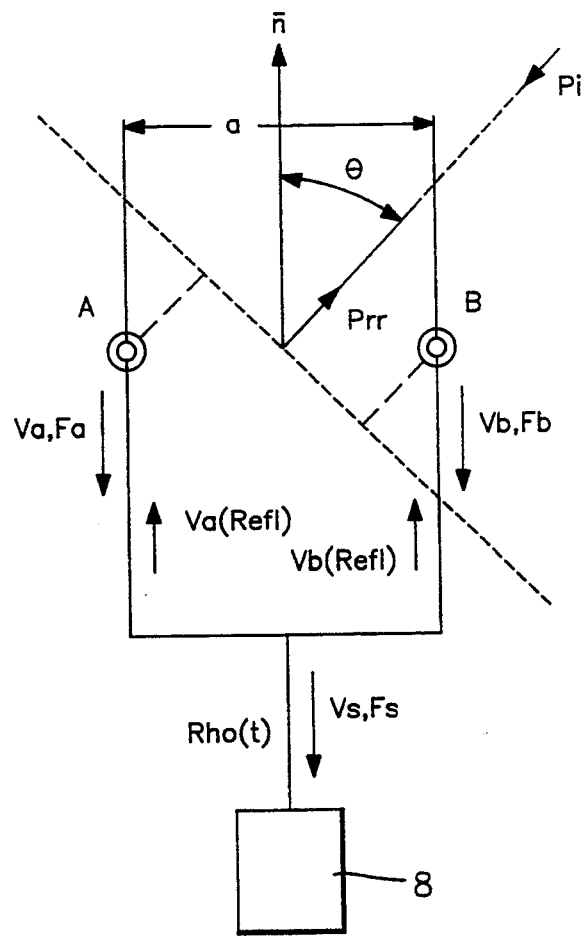

FIG. 2B illustrates in detail what happens if the signals Va,Fa and Vb,Fb received by the point radiators A and B are first added. In FIG. 2, Vs is the vector sum of va+Vb. The addition takes place before the signals have been provided with a code by means of a reflection modulator 8. After addition and encoding, the signals are split into two components of equal amplitude and phase and then radiated again. The reflection modulator 8 is so designed that it has, as a function of the code, an input-reflection-coefficient which has either an absolute value of 1 or 0 but a constant phase, or an absolute value of 1 and a phase which varies, depending on the code, within a given angle range, preferably between $+90°$ and $-90°$.

The following applies to the signals that have been re-radiated:

$$Va(refl) = Rho(t) * VS/2 \quad [3]$$

$$Vb(refl) = Rho(t) * Vs/2 \quad [4]$$

Rho (t) is the complex reflection coefficient of the modulator 8.

Figure 2C:
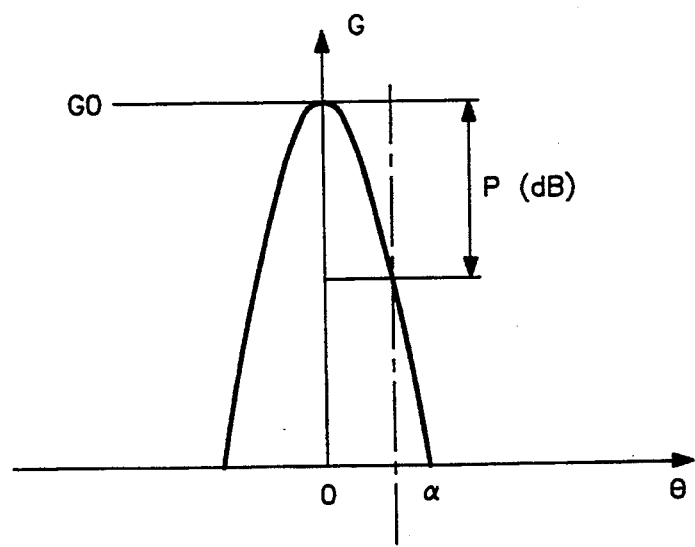

The radiation diagram of FIG. 2C shows a relatively narrow peak in the curve of the amplitude of the signal as a function of the direction $\theta$, which is the result of the addition of the signals Va and Vb. The figure further shows that upon reception at an angle $\alpha$ the amplification loss is P db. As the effective surface of the responder is proportional to the amplification, the RF power received in the responder will decrease proportionally to this amplification loss. After being processed by the reflection modulator 8, the signal is radiated again with a loss of P dB if the interrogation unit is located at the angle $\alpha$. The total loss of the modulated signal received by the interrogation unit from the transponder is then 2*P dB relative to the originally radiated signal.

Figure 2D:
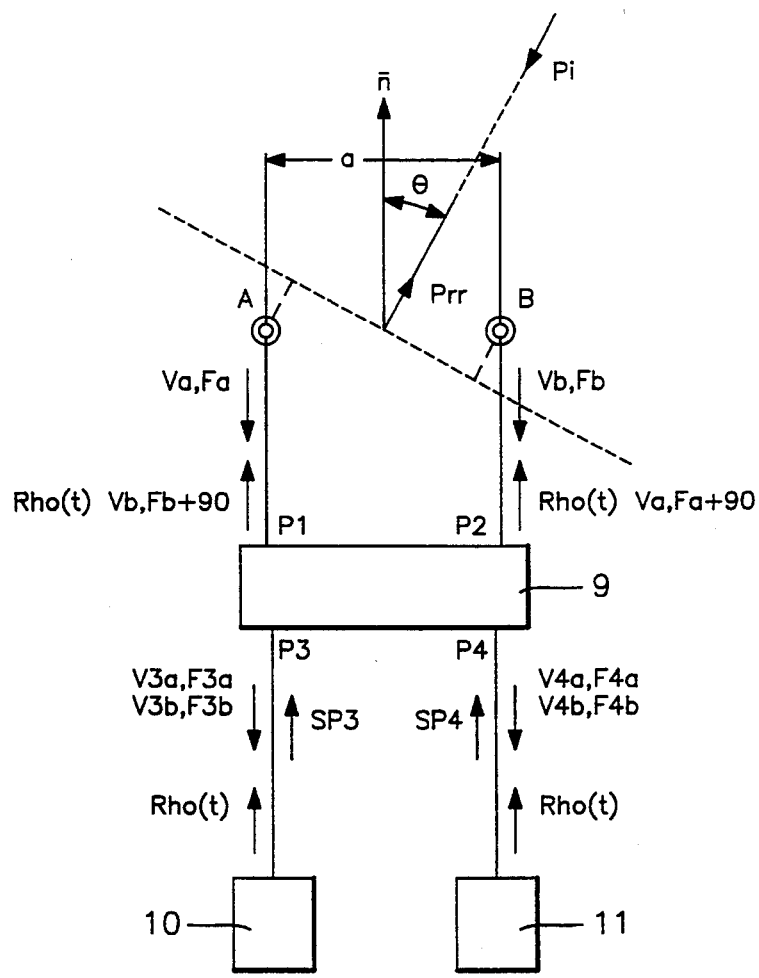

FIG. 2D shows in detail the operation of a responder with an antenna system comprising two point radiators A and B, a 90° hybrid device 9 and two reflection modulators 10 and 11. A hybrid device is a microwave component having four gates which split a signal applied to one of the four gates into two equal parts having a mutual phase difference of 90°. The two reflection modulators modulate either the amplitude of the reflection coefficient Rho(t) in the rhythm of the code or the phase of the reflection coefficient or modulate one of these parameters in the rhythm of a subcarrier wave which itself has been modulated with the code.

With the configuration of FIG. 2D it is possible to interchange the two signals Va and Vb and provide them with an "on/off" modulation or a phase modulation.

FIG. 2D further shows how a signal Va and a signal Vb each with a phase Fa and Fb are applied to a hybrid device 9.

A gate P1 of the hybrid device 9 is connected with point radiator A and a gate P2 of the hybrid device 9 is connected with point radiator B. Further, a gate P3 of the hybrid device 9 is connected with a reflection modulator 10, while a gate P4 of the hybrid device 9 is connected with a reflection modulator 11.

The signal Va, Fa applied to gate P1 of the hybrid device 9 is split into two components, which are formed at the gates P3 and P4 with amplitudes and phases V3a, F3a and V4a, F4a, respectively.

The following applies:

$$V3a = \tfrac{1}{2}\sqrt{2} \cdot Va \text{ and } F3a = Fa \quad [5]$$

$$V4a = \tfrac{1}{2}\sqrt{2} \cdot Va \text{ and } F4a = Fa + 90° \quad [6]$$

The signal Vb, Fb applied to gate P2 of the hybrid device 9 is split into two components which are formed at the gates P3 and P4 with amplitudes and phases V3b, F3b and V4b, F4b.

The following applies:

$$V3b = \tfrac{1}{2}\sqrt{2} \cdot Vb \text{ and } F3b = Fb + 90° \quad [7]$$

$$V4b = \tfrac{1}{2}\sqrt{2} \cdot Vb \text{ and } F4b = Fb \quad [8]$$

The reflection modulators 10 and 11 multiply the sum signals V3a+V3b and V4a+V4b with the complex reflection coefficient Rho(t).

After reflection by the modulators 10, 11, the following signals SP3 and SP4 will be applied to gate P3 and gate P4 of the hybrid device 9:

$$SP3 = Rho(t) * (V3a + V3b) \quad [9]$$

and $$SP4 = Rho(t) * (V4a + V4b) \quad [10]$$

These signals in turn are both split by the hybrid device 9 again and divided between the gates P1 and P2.

At gate 1 a signal SP1 is formed which is the sum of the following two signals:

$$\tfrac{1}{2}\sqrt{2} \cdot Vb * Rho(t) * (V3a + V3b) \text{ (angle 0°)} + \quad [11]$$

$$\tfrac{1}{2}\sqrt{2} \cdot Vb * Rho(t) * (V4a + V4b) \text{ (angle 90°)} =$$

$$Rho(t) * Vb, \text{ angle } (Fb + 90°)$$

At gate 2 a signal SP2 is formed, which is the sum of the following two signals:

$$\tfrac{1}{2}\sqrt{2} \cdot Vb * Rho(t) * (V3a + V3b) \text{ (angle 90°)} + \quad [12]$$

$$\tfrac{1}{2}\sqrt{2} \cdot Vb * Rho(t) * (V4a + V4b) \text{ (angle 0°)} =$$

$$Rho(t) * Va, \text{ angle } (Fa + 90°)$$

The result of this operation by the hybrid device 9 and the two reflection modulators 10 and 11 is that the two signals Va,Fa and Vb,Fb have been interchanged and modulated with the code as will appear from expressions [11] and [12].

These two signals are now applied to the two point radiators A and B so that a modulated electromagnetic wave Prr arises which is directed to the interrogation unit.

Figure 2E:
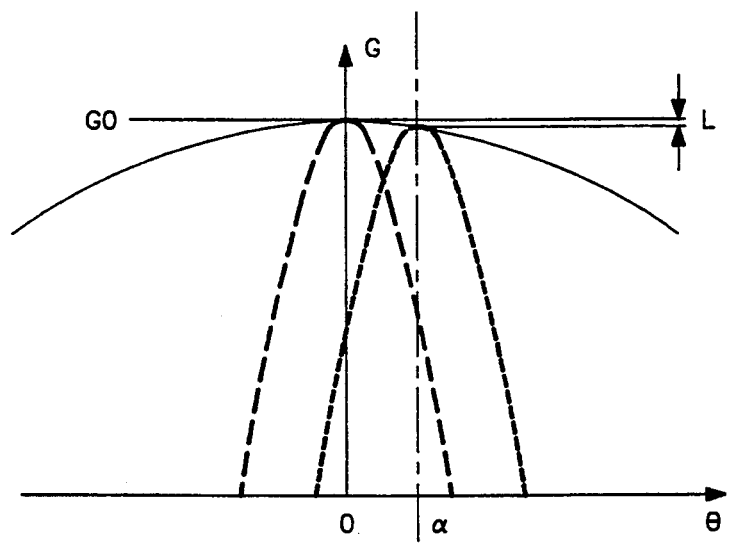

The radiation diagram of FIG. 2E shows a comparatively broader curve of the amplitude as a function of the direction $\theta$ than does FIG. 2C, which is a consequence of the retroreflective effect that has been obtained by interchanging the signals Va and Vb. FIG. 2E further indicates that during reception at an angle $\theta = \alpha$ the amplification loss is not P db but a function of the angle $\theta$, so that the decrease of the amplification of a retroreflective responder (single path) equals:

$$GO * (1 - \cos \alpha) \quad [13]$$

where GO is the amplication in the direction for which applies $\theta = 0$.

After reflection on the reflection modulator, the signal is radiated again with a loss L if the interrogation unit lies in a direction which includes an angle $\alpha$ with the normal n to the connecting line between the point sources A and B. However, the total loss of the modulated signal received by the interrogation unit from the transponder is now:

$$2 * GO * (1 - \cos \alpha) \quad [14]$$

In fact, this loss is only a correction of the effective aperture of the transponder as a function of the angle $\theta$. This concludes the discussion and definition of the basic principle of a retroreflective responder. On the basis of this principle, many embodiments are possible. Some preferred embodiments will now be discussed.

Figure 3:
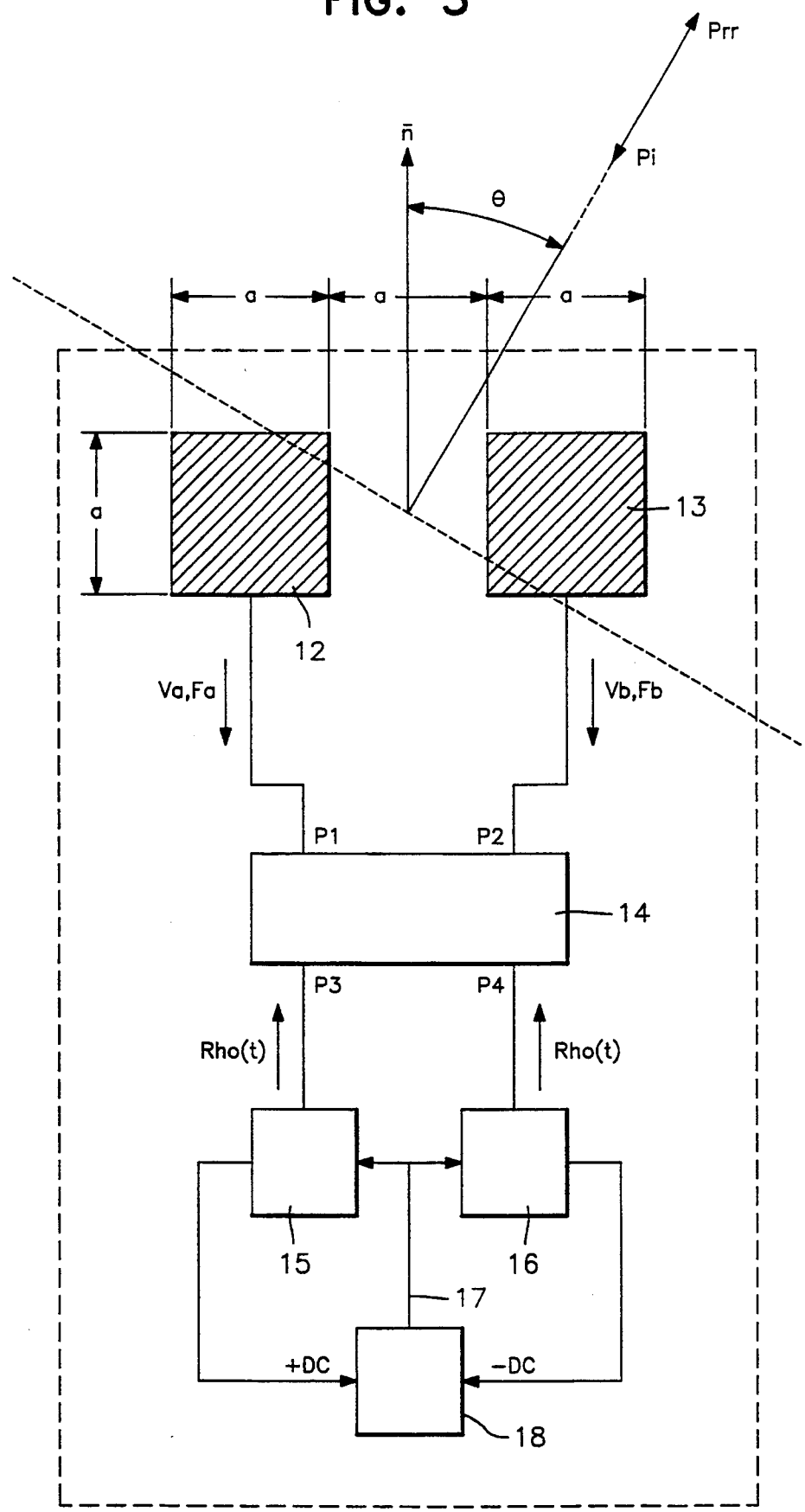
FIG. 3 schematically shows an example of a retroreflective responder for a system according to the invention.

FIG. 3 schematically snows a retroreflective microwave responder in an embodiment with so-called "patch" antennas (microstrip radiators) 12 and 13. The dimension a in this example indicates the length of the sides of the "patch" antennas surfaces and the distance between "patch" antennas surfaces, and is preferably between a quarter and a half wavelength of the interrogation field. The responder further comprises a 90° hybrid device 14, two reflection modulators 15, 16 which effect an amplitude modulation and a semiconductor chip 18 with a control and storage function.

A "patch" antenna is a planar microstrip structure which on account of its symmetry is particularly suitable for receiving and transmitting circularly polarized waves and which, in an application as a receiving antenna for a circular wave, splits it into two orthogonal components.

The hybrid device 14 interchanges the received signals Va,Fa and Vb,Fb and by means of on/off modulation provides these signals with the code or a subcarrier wave which has been modulated with the code.

The two reflection modulators 15 and 16 have a double function, namely, realizing the switch function for the reflection modulation and providing a DC voltage for the chip 18 with the control and storage function. The chip provides a control signal 17 for the two modulators 15 and 16.

The connections between the antenna elements and the hybrid device are transmission lines having the same time delay. The same applies to the connections between the hybrid device and the modulators 15, 16.

Figure 4:
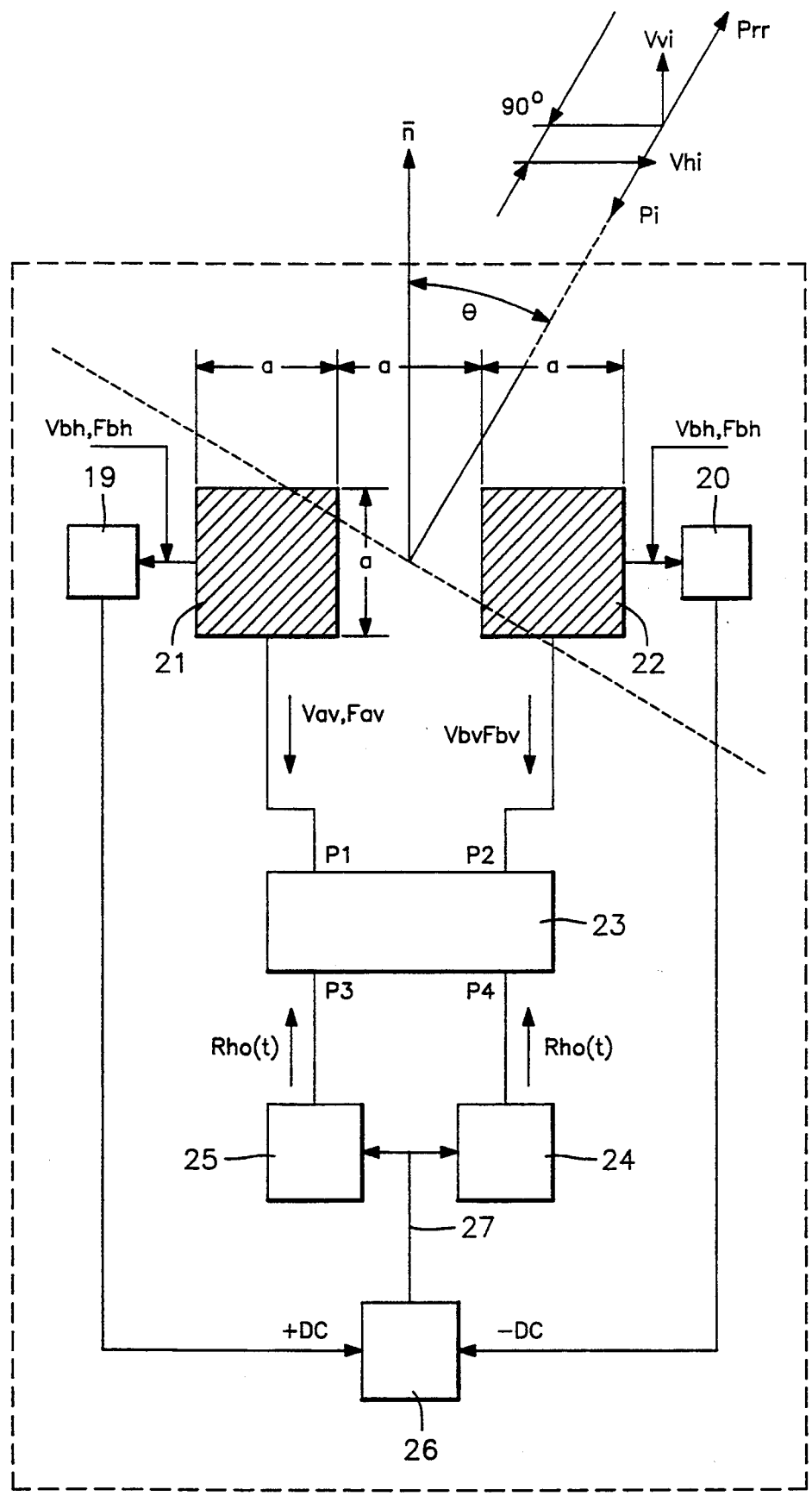
FIGS. 4-6 schematically show a number of further embodiments of retroreflective responders for an identification system according to the invention.

FIG. 4 schematically shows an embodiment of a circular retroreflective microwave responder in an embodiment with two so-called "patch" antennas (microstrip radiators) 21 and 22.

The dimension a in this embodiment indicates the length cf the sides of the square "patch" antenna areas and further the distance between the "patch" antenna areas. The dimension a is preferably a quarter to half a wavelength of the interrogation field. Further, the responder comprises a 90° hybrid device 23; two reflection-phase-modulators 24 and 25; two toptop detector devices 19, 20, which can convert the provided RF power into a DC voltage; and a semiconductor chip 26 provided with an electric circuit and having a control and storage function. The interrogation unit comprises in this case at least two circularly polarized antennas of which one is used as a transmitting antenna for radiating a circular wave front Pi, and another as a receiving antenna which is used for receiving the linear retroreflected and modulated wave Prr coming from the responder of FIG. 4. The "patch" antennas 21 and 22 used can receive the two orthogonal components Vvi and Vhi of the circular wave Pi coming from the interrogation unit. At the two "patch" antennas, the component Vhi causes voltages Vah and Vbh to arise, which are applied to the two detector devices 19 and 20. At the two "patch" antennas 21 and 22, the component Vvi causes voltages Vah and Vbh to arise, which, in the manner described with reference to FIG. 2C, are applied to the 90° hybrid device 23, which, together with the two reflection-phase-modulators 24 and 25, causes the signals Vav,Fav and Vbv,Fbv to be interchanged and provided with a code. The two phase modulators can be controlled from the chip 26 by means of a controlsignal 27.

The above-described retroreflective microwave transponder, together with the circularlypolarized transmitting and receiving antenna(s) of the interrogation unit, provides an identification system whose operation is independent of the rotational position of the transponder about the normal n, as defined in FIG. 1.

Figure 5:
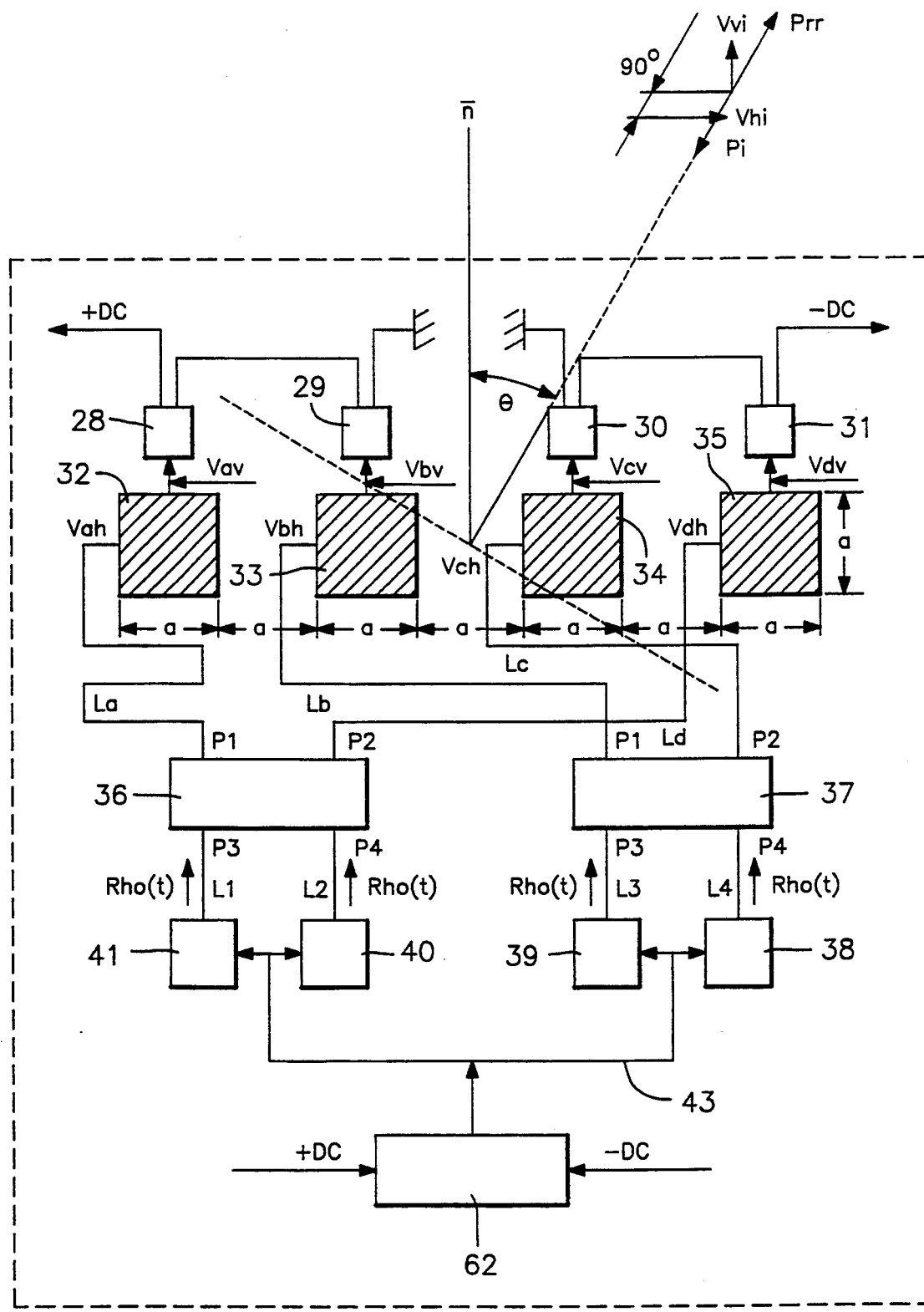

FIG. 5 schematically shows a circularly retroreflective microwave responder in an embodiment having four so-called "patch" antennas (microstrip radiators) 32, 33, 34, 35, in which a is a dimension which is preferably a quarter or half a wavelength.

The dimension a in this example indicates the width and the length of the antenna areas, as well as the mutual distances between the antenna areas. Further present are two 90° hybrid devices 36 and 37, four reflection-phase-modulators 38, 39, 40, and 41; four top-top detector devices 28, 29, 30 and 31 which can convert the provided RF power into a DC voltage; and a chip 42 comprising a semiconductor circuit and having a control and storage function.

The "patch" antennas and the two hybrid devices are connected to each other in such a manner that the RF voltages Vbh,Fbh and Vch,Fch are interchanged according to the principle defined in FIG. 2D and the RF voltages Vah,Fah and Vdh,Fdh are also interchanged according to the principle defined in FIG. 2D. Further, the electrical path lengths of the connections La, Lb, Lc, Ld between the antennas and the hybrid devices, and the connections $L_1$–$L_4$ between the hybrid devices and the modulators 38-41 are mutually equal.

In this embodiment the interrogation unit comprises at least two circularly polarized antennas, of which at least one, the transmitting antenna, is used for radiating the circularly wavefront Pi. At least one other antenna is used for receiving the linear retroreflected and modulated wave Prr, coming from the responder. The "patch" antennas 32, 33, 34 and 35 used can receive the two orthogonal components Vvi and Vhi of the circular wave Pi which comes from the interrogation unit. At the "patch" antennas, the component Vvi causes the voltages Vav, Vbv, Vcv and Vdv to arise, which are applied to the four respective detector devices 28, 29, 30 and 31. At the patch antennas 32, 33, 34 and 35, the component Vhi causes voltages Vah, Vbh, Vch and Vdh to arise which, in the manner described with reference to FIG. 2D, are applied to two 90° hybrid devices 36 and 37 which, together with the reflection-phase-modulators 38, 39, 40 and 41 effect the interchange of Vbh,Fbh and Vch,Fch and of Vah, Fah and Vdh,Fdh and the encoding of these signals. The phase modulators are controlled from the chip 42 by means of a control signal 43.

The microwave responder as described above, together with the circularly polarized transmitting and receiving antenna of the interrogation unit, forms an identification system whose operation is independent of rotation of the responder about the direction n as defined in FIG. 1.

Figure 6:
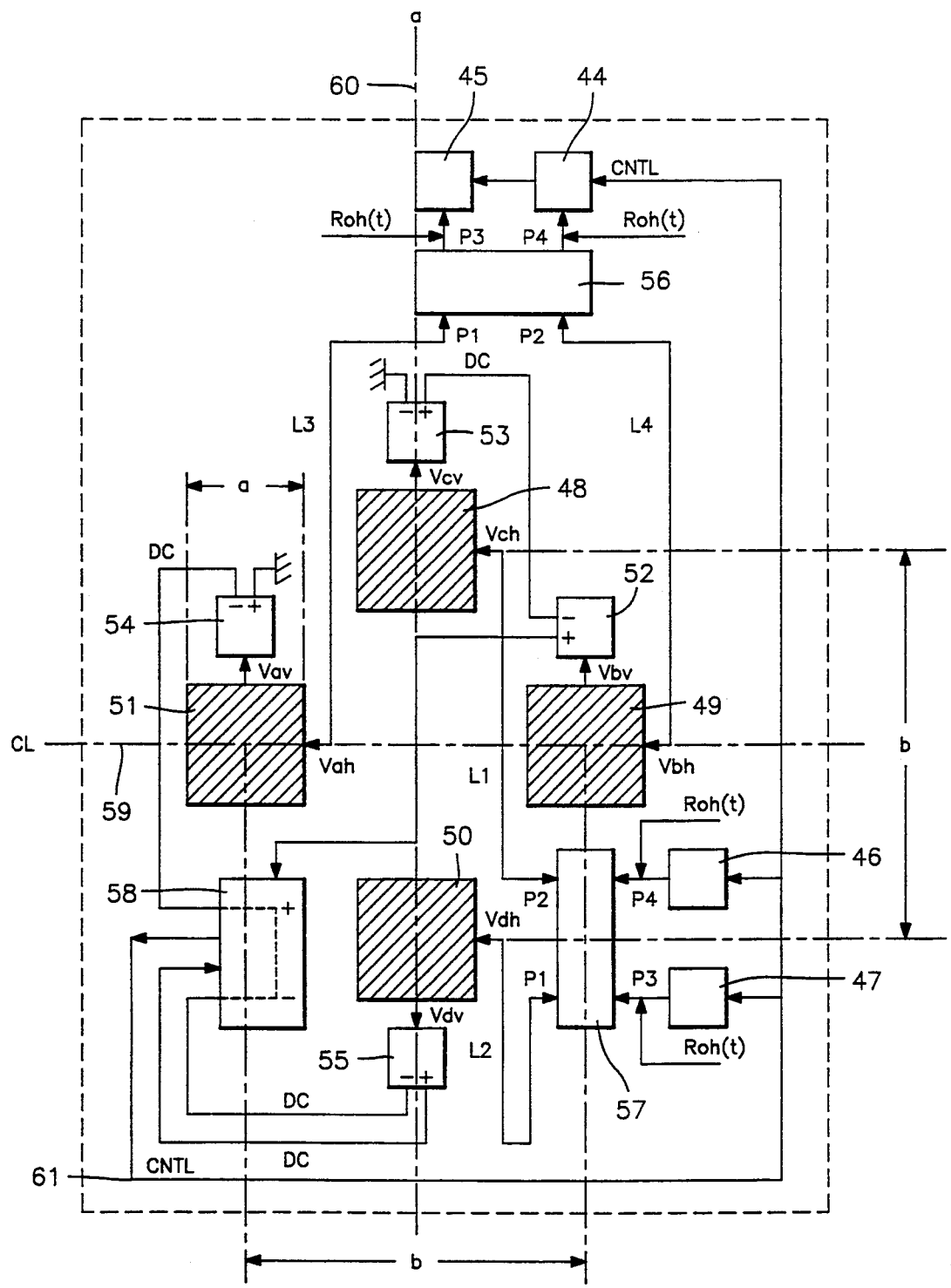

FIG. 6 schematically snows yet another circularly retroreflective microwave responder in an embodiment comprising four so-called "patch" antennas 48, 49, 50, 51. These "patch" antennas are grouped in pairs along two mutually perpendicular axes of symmetry 59 and 60 at a mutual distance b. The sides of the "patch" antennas have a dimension a. The dimensions a and b are preferably between a quarter and half a wavelength of the interrogation field. Further, the responder shown comprises two 90° hybrid devices 56 and 57; four complex reflection modulators 44, 45, 46 and 47; four top-top detector devices 52, 53, 54, 55 which can convert the provided RF power of the signals Vav, Vbv, Vcv, Vdv into a DC voltage; and a chip 58 provided with a semiconductor circuit and having a control and storage function.

The "patch" antennas 49 and 51 are connected to the 90° hybrid device 56 by means of transmission lines $L_3$ and $L_4$, so that the complex RF voltages Vah,Fah and Vbh,Fbh can be interchanged and can be provided with the unique responder code according to the principle defined in FIG. 2D.

The "patch" antennas 48 and 50 are connected to the 90° hybrid device 57 by means of transmission lines $L_1$ and $L_2$, so that the complex RF voltages Vch, Fch and Vdh, Fdh can be interchanged and provided with the unique responder code according to-the principle defined in FIG. 2D. The transmission lines $L_1$, $L_2$, $L_3$ and $L_4$ all provide the same time delay.

Reflection modulators 44, 45, 46 and 47 are connected to the output gates of the hybrid devices 56 and 57 by means of transmission lines having an equal time delay. The modulation signal 61 provided by the chip 58 takes care of variation of the complex reflection coefficient Rho(t) in the rhythm of the code.

The circular wave Pi radiated by the transmitting antenna of the interrogation unit is split by the "patch" antennas into two orthogonal components, one of which is used for the encoded retroreflected wave Prr and the other is used to provide the responder with supply energy after rectification in the top-top detector devices 52, 53, 54 and 55.

It is observed that after the foregoing many variants will readily occur to a person of ordinary skill in the art. Thus, in the embodiments shown an even number of symmetrically arranged antenna elements are used. It is also possible to use an odd number if one of the elements lies on an axis of symmetry and reflects its own received signal with a suitable delay which corresponds with the time delay of the other signals.

I claim:

1. A microwave identification system comprising:
   interrogation transmitter/receiver means and an interrogation antenna system for transmitting an interrogation electromagnetic field and receiving responsive electromagnetic waves;
   a plurality of responders each including a responder antenna system for communicating with the interrogation transmitter/receiver means, each of said responders being responsive to the interrogation electromagnetic field to generate responsive electromagnetic waves, the responder antenna system comprising an antenna array having at least first and second transmitting/receiving antenna elements and modulation means interconnecting the first and second transmitting/receiving antenna elements, the first and second transmitting/receiving antenna elements being responsive to the interrogation electromagnetic field to generate at least first and second antenna output signals, respectively, the modulation means responsive to the first and second antenna output signals for generating at least first and second modulated output signals which are encoded with a responder code that is particular to the associated responder, and the modulation means applying the first and second modulated output signals to the second and first antenna elements, respectively.

2. An identification system according to claim 1, wherein the responder antenna system comprises a linear or planar array of antenna elements retroreflectivity with respect to the reflected modulated signals is achieved by interchange and reradiation of signals received on the elements of an antenna system of a responder that comprises a linear or planar array of antenna elements.

3. An identification system according to claim 2, wherein the responder antenna system comprises a linear array of antenna elements which are spaced at equal mutual distances, the modulated output signals being exchanged between antenna elements relative to an axis of symmetry of the array in such a manner that the time delay of the modulated output signals between two cooperating elements is equal for each pair of elements between which an exchange is made.

4. An identification system according to claim 3, wherein the responder antenna system comprises an odd number of antenna elements, one antenna element lying on the axis of symmetry of the array and said one element reflecting the antenna output signal with a delay that is equal to the time delay between each pair of the other elements.

5. An identification system according to claim 2, wherein the responder antenna system comprises a planar array of antenna elements which are arranged symmetrically relative to two mutually perpendicular main axes.

6. An identification system according to claim 1, wherein the interrogation transmitter/receiver means transmits a circularly polarized microwave signal.

7. An identification system according to claim 6, wherein the responder antenna system receives the microwave signal and separates it into two orthogonal components, one of the orthogonal components being rectified and used for energy supply of the responder, and the other component, after addition of the modulated code by the modulation means, being retroreflected.

8. An identification system according to claim 7, wherein the responder antenna system comprises a patch microstrip antenna.

9. An identification system according to claim 1, wherein the modulation means generates the responder code by variation of the absolute value of a complex reflection coefficient.

10. An identification system according to claim 1, wherein the modulation means generates the responder code by variation of the phase of a complex reflection coefficient.

11. An identification system according to claim 1, wherein the modulation means generates a subcarrier wave with the responder code by variation of the absolute value of a complex reflection coefficient.

12. An identification system according to claim 1, wherein the modulation means generates a subcarrier wave with the responder code by variation of the phase of a complex reflection coefficient.

13. An identification system according to claim 1, wherein the responder antenna system comprises two patch antenna elements which are arranged symmetrically relative to an axis of symmetry, and wherein the modulation means comprises first and second reflection modulators, and further comprising a 90° hybrid means having two input gates and two output gates, each input gate being connected with a patch antenna element and each output gate being connected with one of the reflection modulators, the 90° hybrid device being suitable for splitting a microwave signal applied to an input gate into two components of equal power and a mutual phase difference of 90°, which components are generated at the two output gates.

14. An identification system according to claim 13, wherein the responder antenna system comprises a plurality of pairs of antenna elements, each pair arranged along one or more main axes, and the time delay between cooperating antenna elements being equal for all pairs of antenna elements.

* * * * *